(12) United States Patent
Hur et al.

(10) Patent No.: US 6,334,601 B1
(45) Date of Patent: Jan. 1, 2002

(54) DETACHABLE SEAT FOR AN AUTOMOBILE

(75) Inventors: Jae-Myoung Hur; Tae-Soo Kim, both of Kyunggi-Do (KR)

(73) Assignee: Dae Won San Up Co., Ltd., Kyunggi-Do (KR)

(*) Notice: Subject to any disclaimer, the term of this patent is extended or adjusted under 35 U.S.C. 154(b) by 0 days.

(21) Appl. No.: 09/650,700

(22) Filed: Aug. 29, 2000

(30) Foreign Application Priority Data

Jun. 23, 2000 (KR) .......................................... 00-34800

(51) Int. Cl.⁷ .............................................. F16M 13/00
(52) U.S. Cl. .................................... 248/430; 296/65.03
(58) Field of Search ...................... 296/65.03; 248/430, 248/424, 127, 129, 158

(56) References Cited

U.S. PATENT DOCUMENTS

| | | | |
|---|---|---|---|
| 5,915,778 A | * 6/1999 | Winkelhake et al. | 296/65.05 |
| 6,039,401 A | * 3/2000 | Rus | 296/65.03 X |
| 6,053,555 A | * 4/2000 | Neale | 296/65.03 |
| 6,056,346 A | * 5/2000 | Smuk | 296/65.03 |
| 6,196,610 B1 | * 3/2001 | Pesta et al. | 296/65.03 |
| 6,227,619 B1 | * 5/2001 | Pesta et al. | 296/65.03 X |

FOREIGN PATENT DOCUMENTS

GB 2113986 * 8/1983 ............. 248/503.1

* cited by examiner

*Primary Examiner*—Ramon O Ramirez
(74) *Attorney, Agent, or Firm*—Arent Fox Kintner Plotkin & Kahn PLLC

(57) ABSTRACT

A detachable seat for an automobile is disclosed. The detachable seat comprises a seat cushion. A seat leg bracket is mounted to the lower surface of the seat cushion and has two laterally spaced portions. Two front locking units for locking the front portion of the seat to an automobile body are mounted to both sides of the front portion of the seat leg bracket and connected to each other by a front operating link to be operated in conjunction with each other. Two roller locking units are mounted to the front portion of the seat leg bracket to be respectively connected to the front locking units. Two front roller units are mounted to the front portion of the seat leg bracket to be respectively connected to the roller locking units. Two rear locking units are mounted to both sides of the rear portion of the seat leg bracket on the opposite side of the seat leg bracket to the rear roller units and connected to each other by a rear operating link to be operated in conjunction with each other. Two rear roller units are mounted to the rear portion of the seat leg bracket to be respectively connected to the front roller units by links.

7 Claims, 13 Drawing Sheets

DETACHABLE SEAT FOR AN AUTOMOBILE

BACKGROUND OF THE INVENTION

1. Field of the Invention

The present invention relates, in general, to a detachable seat for an automobile and, more particularly, to a detachable seat for an automobile, which allows large space to be ensured for freight in an automobile, permits the automobile to be utilized for freight and traveling purposes and allows the seat to be easily moved and deposited by the old and the weak.

2. Description of the Prior Art

With the development of civilization, there occurs the advent of multipurpose articles in which various articles are integrated into a single article and various purposes are achieved in the single article. This phenomenon is caused by a human being's desire of achieving a variety of purposes easily and economically. This phenomenon occurs in the case of vehicles that are closely related with the human being's daily life. That is, there is increased a demand for a multipurpose vehicle that is capable of carrying a large amount of load in the case of the change of residence or the management of business and accommodating all family members in the case of travel or picnic.

A station wagon and a van are vehicles having multipurpose bodies that are capable of accommodating passengers and freight. In such a vehicle, a front seat on which a driver is seated is mounted to the front portion of the vehicle, a first rear seat on which passengers are seated is disposed behind the front seat, and a second rear seat on which passengers are seated is positioned behind the first rear seat.

In the meantime, since the size of the trunk of the vehicle is confined, the vehicle cannot be loaded with a large amount of freight. Additionally, if the vehicle is loaded with freight having a large length or height, the appearance of the vehicle is spoiled owing to the openness of a trunk lid, a driver's driving is disturbed owing to the occurrence of noise, and the damage of the trunk rid occurs and shortens the life span of the trunk rid owing to the collision between the freight and the vehicle.

A folding rear seat has been proposed to ensure large space for freight. However, since a vehicle must be loaded with freight in contact with a folded rear seat, the rear seat may be damaged and sufficient space cannot be ensured.

In addition, there is proposed a seat mounting structure in which an insertion and fixation unit having an engaging member is formed on the front end of a frame attached to the lower surface of a seat cushion and a fixation unit having an elastic ball stopper is formed on the rear end of the frame, a locking unit comprising a locker for detachably fixing the insertion and fixation unit and a movement link for moving the locker is mounted on a floor panel, and a striker for detachably mounting the fixation unit is mounted on the floor panel, thereby enabling a rear seat to be detached from an automobile body. However, since the front end of the rear seat is fixed by insertion into the floor panel and the rear end of the rear seat is fixed by means of the striker, the rear seat may be easily unlocked owing to rapid braking or car accident, thereby endangering passengers.

Additionally, since a user must move a detached seat to a desired place by human power, the old and the weak have difficulty in moving and depositing the detached seat.

SUMMARY OF THE INVENTION

Accordingly, the present invention has been made keeping in mind the above problems occurring in the prior art, and an object of the present invention is to provide a detachable seat for an automobile, which allows the attachment and detachment of the seat to the automobile to be easily performed, facilitates the removal of the detached seat from the automobile, and permits the automobile to be utilized for freight and traveling purposes.

In order to accomplish the above object, the present invention provides a detachable seat for an automobile, comprising: a seat cushion; a seat leg bracket mounted to the lower surface of the seat cushion, the seat leg bracket having two laterally spaced portions; two front locking units for locking the front portion of the seat to an automobile body, the front locking units being mounted to both sides of the front portion of the seat leg bracket and being connected to each other by a front operating link to be operated in conjunction with each other; two roller locking units mounted to the front portion of the seat leg bracket to be respectively connected to the front locking units; two front roller units mounted to the front portion of the seat leg bracket to be respectively connected to the roller locking units; two rear locking units mounted to both sides of the rear portion of the seat leg bracket on the opposite side of the seat leg bracket to the rear roller units and connected to each other by a rear operating link to be operated in conjunction with each other; and two rear roller units mounted to the rear portion of the seat leg bracket to be respectively connected to the front roller units by links.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
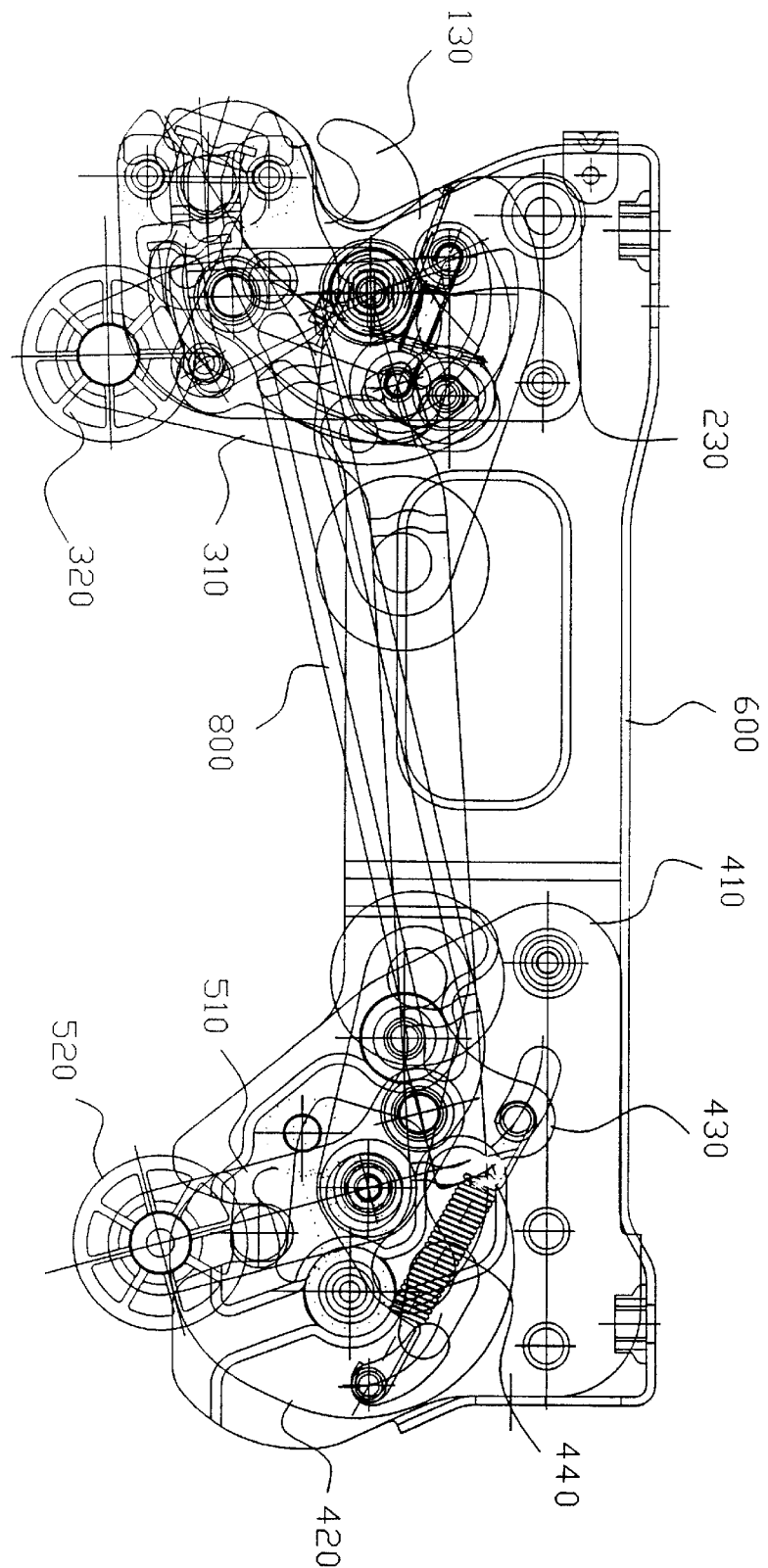
FIG. 1 is a side view showing a detachable seat in accordance with a preferred embodiment of the present invention.

Reference now should be made to the drawings, in which the same reference numerals are used throughout the different drawings to designate the same or similar components.

Figure 2:
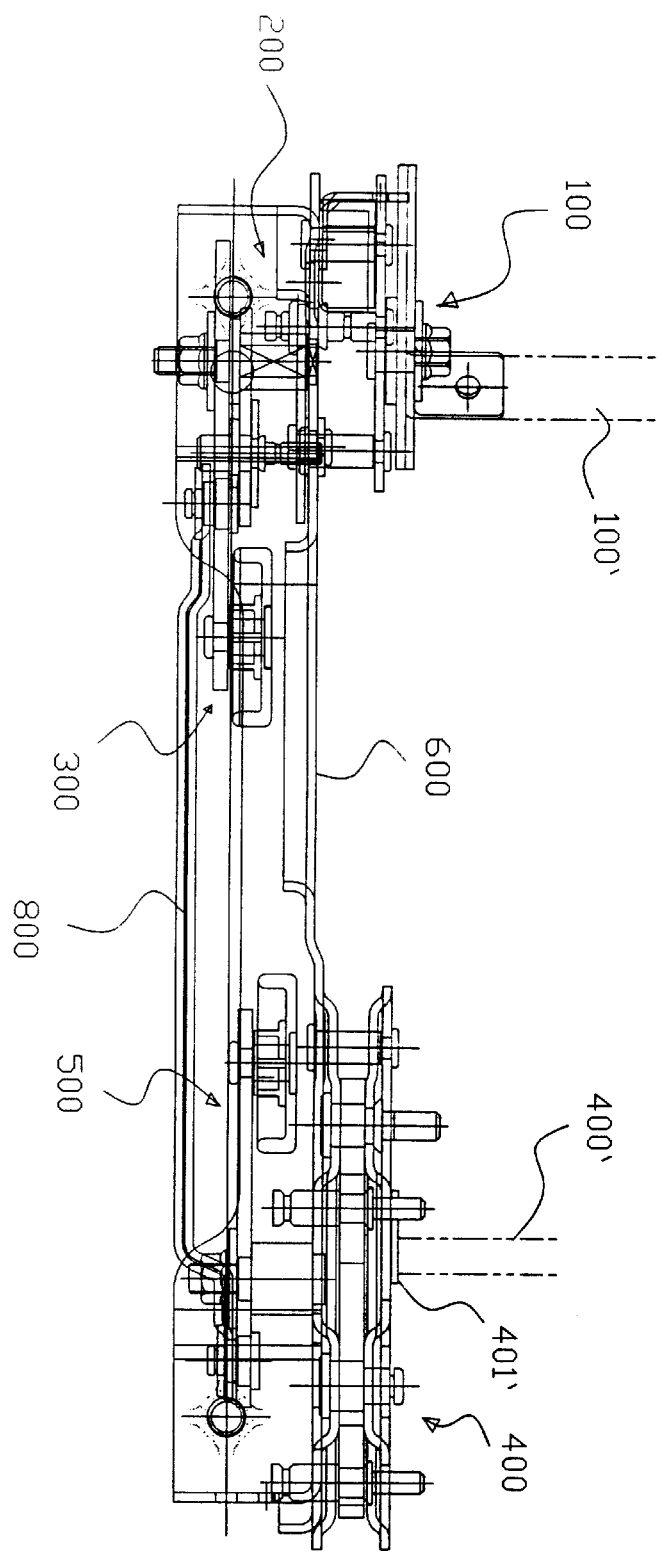
FIG. 2 is a plan view showing the left portion of the seat.
Figure 14:
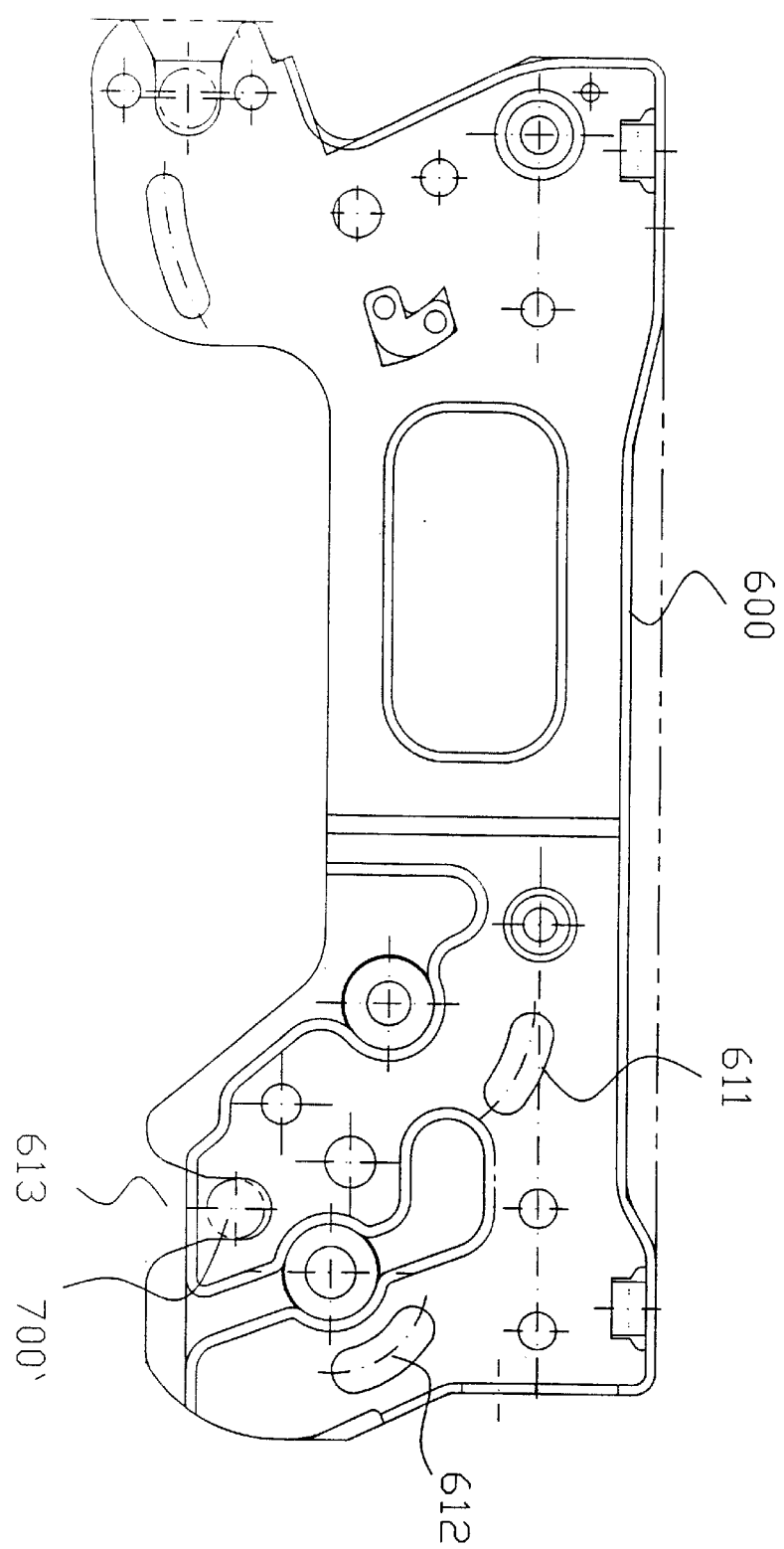
FIG. 14 is a view showing the seat leg bracket of the embodiment.

FIG. 1 is a side view showing a detachable seat in accordance with a preferred embodiment of the present invention. FIG. 2 is a plan view showing the left portion of the seat. FIG. 14 is a view showing the seat leg bracket of the embodiment.

The detachable seat of the present invention includes two front locking units 100 that are mounted to both sides of the front portion of a seat leg bracket 600 and serve to lock the front portion of the seat to an automobile body. Two roller locking units 200 are mounted to the front portion of the seat leg bracket 600 to be respectively connected to the front locking units 100. Two front roller units 300 are mounted to the front portion of the seat leg bracket 600 to be respectively connected to the roller locking units 200. Two rear locking units 400 are mounted to both sides of the rear portion of the seat leg bracket 600 and serve to lock the rear portion of the seat to the automobile body. Two rear roller units 500 are mounted to the rear portion of the seat leg bracket 600, to which the rear locking units 400 are mounted, to be respectively connected to the front roller units 300 by links.

Figure 3:
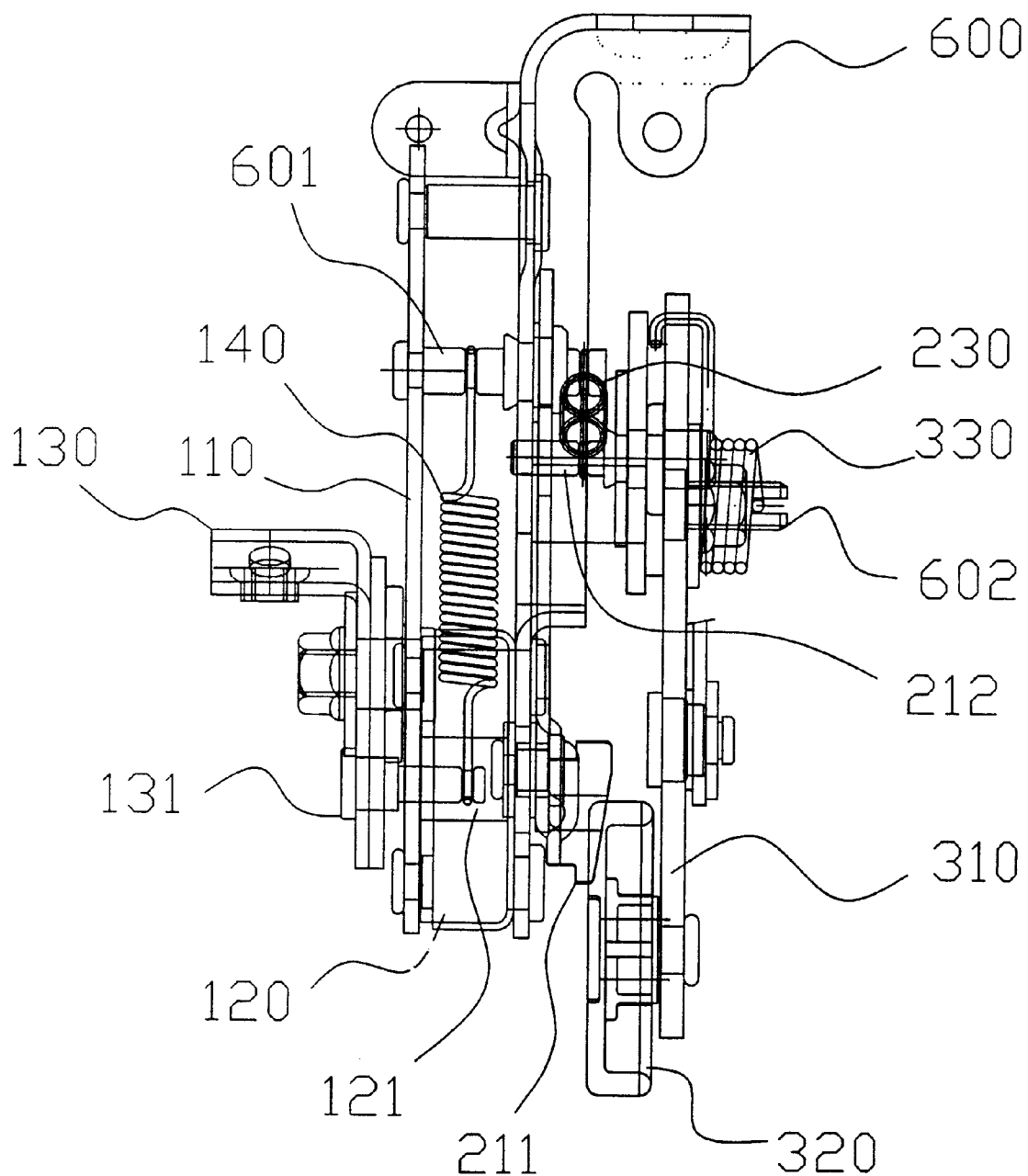
FIG. 3 is a view showing the front portion of a seat leg bracket of the embodiment.
Figure 4:
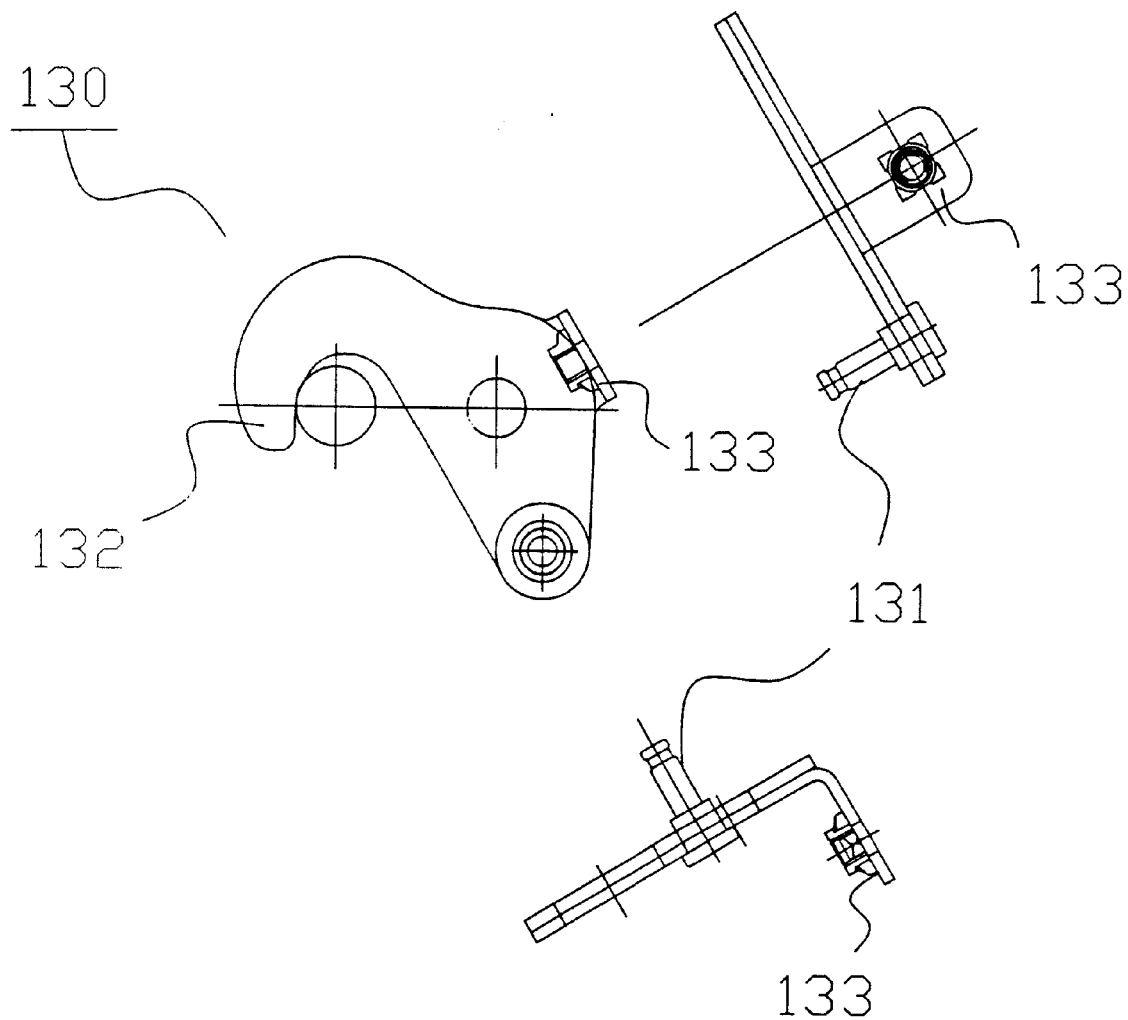
FIG. 4 is a view showing the front locking unit of the seat leg bracket of the embodiment.

Each front locking unit 100 serves to lock the front portion of the seat leg bracket 600 to the automobile body. As depicted in FIGS. 3 and 4, the front locking unit 100 includes a base bracket 110 that is mounted to the seat leg bracket 600 to be spaced apart from the seat leg bracket 600 by a predetermined interval. A front stopper 120 is interposed between the base bracket 110 and the seat leg bracket 600 to be in contact with one surface of the base bracket 110 and one surface of the seat leg bracket 600. A locking bracket 130 is connected to the other side of the base bracket 110 to which the front stopper 120 is not mounted, in a hinge fashion. A locking return spring 140 is disposed between the seat leg bracket 600 and the base bracket 110.

Figure 5:
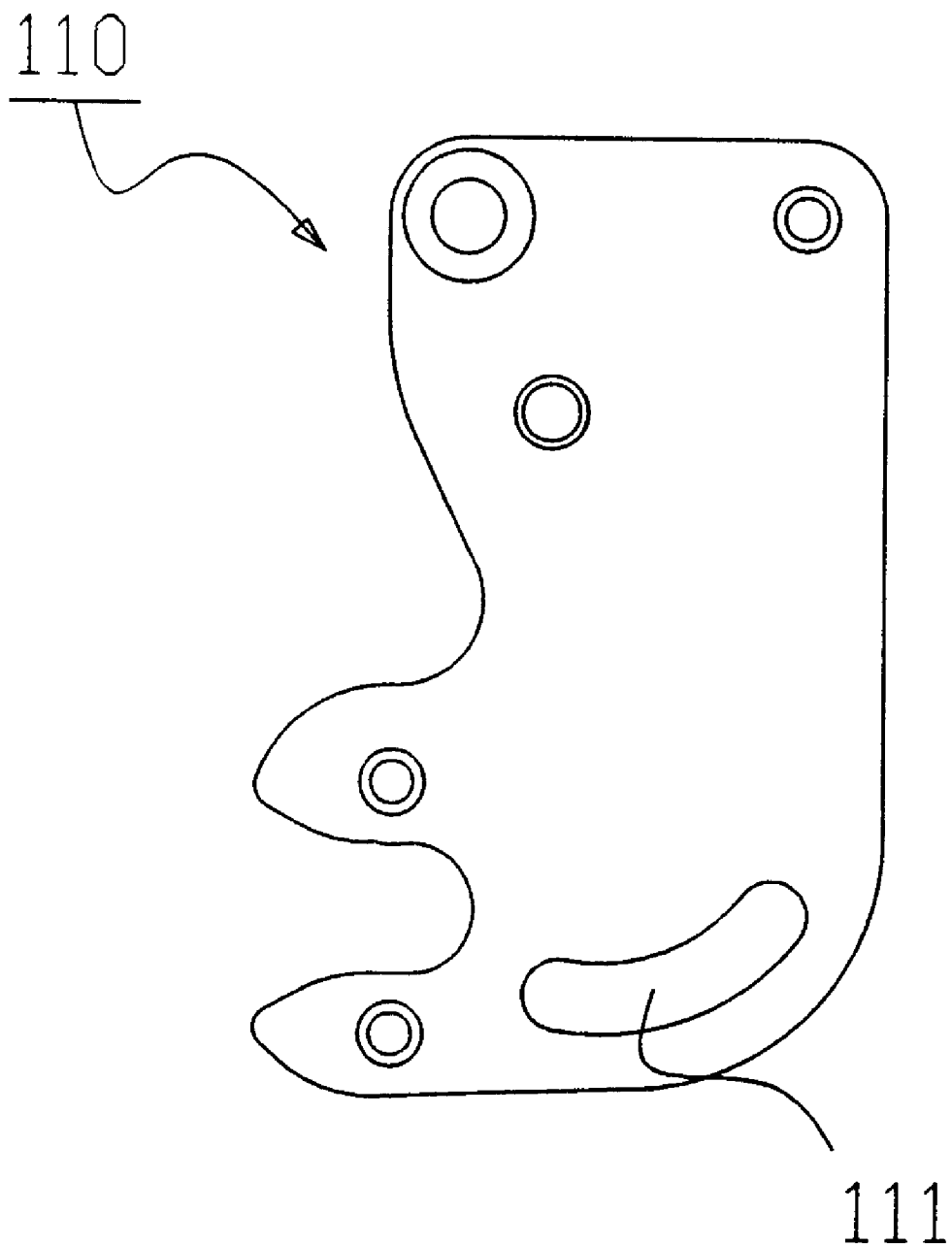
FIG. 5 is a view showing a base bracket of the embodiment.

The front locking unit 100 is riveted to the seat leg bracket 600 with the front stopper 120 interposed between the front locking unit 100 and the seat leg bracket 600. As illustrated in FIG. 5, a guide slot 111 is formed on the lower portion of the base bracket 110 to receive a spring support rod 131 that is inserted into the locking bracket 130.

An insertion rod 700 is inserted into the front stopper 120. The front stopper 120 is riveted to the base bracket 110 and the seat leg bracket 600. The front stopper 120 has an insertion notch 121.

The locking bracket 130 serves to lock the seat leg bracket 600 to the automobile body. The center portion of the locking bracket 130 is fixed to the base bracket 110 in a hinge fashion. As shown in FIG. 4, a fixing hook 132 for fixing the insertion rod 700 is formed on one end of the locking bracket 130, a spring support rod 131 that pierces the guide slot 110 of the base bracket 110 is formed on the other end of the locking bracket 130 in a projection fashion, and a connecting piece 133 is formed on the center portion of the locking bracket 130.

The locking return spring 140 serves to automatically return the locking bracket 130 to its original position when the operation of the locking bracket 130 by means of a front operating link 100' is completed. The locking return spring 140 is disposed between the seat leg bracket 600 and the base bracket 110 with its one end hooked on the spring support rod 131 of the locking bracket 130 and its other end hooked on a rivet shaft 601 that connects the seat leg bracket 600 and the base bracket 110.

The front locking unit 100 allows the front portion of the seat leg bracket 600 to be locked to the insertion rod 700 of the automobile body in such a way that the insertion rod 700 is inserted between the front stopper 120 and the hook 132 of the locking bracket 130. The locking bracket 130 is situated to allow its hook 132 to form a circle together with the insertion notch 121 of the front stopper 120, by the locking return spring 140 at its initial stage.

That is, since the front locking units 100 are mounted to both sides of the seat leg bracket 600 and the front locking units 100 mounted to both sides are connected by the single front operating link 100', the locking bracket 130 is rotated around the hinge during the operation of the front operating link 100' and the fixing hook 132 is rotated by the rotation of the locking bracket 130, thereby allowing the insertion rod 700 to be freely removed. At this time, since the spring support rod 131 of the locking bracket 130 is moved along the guide slot 111 of the base bracket 110 and thereby releases the locking return spring 140, the locking bracket 130 is rotated around the hinge and returned to its original position by the restoring force of the locking return spring 140 when the force acted on the front operating link 100' is removed.

Figure 6:
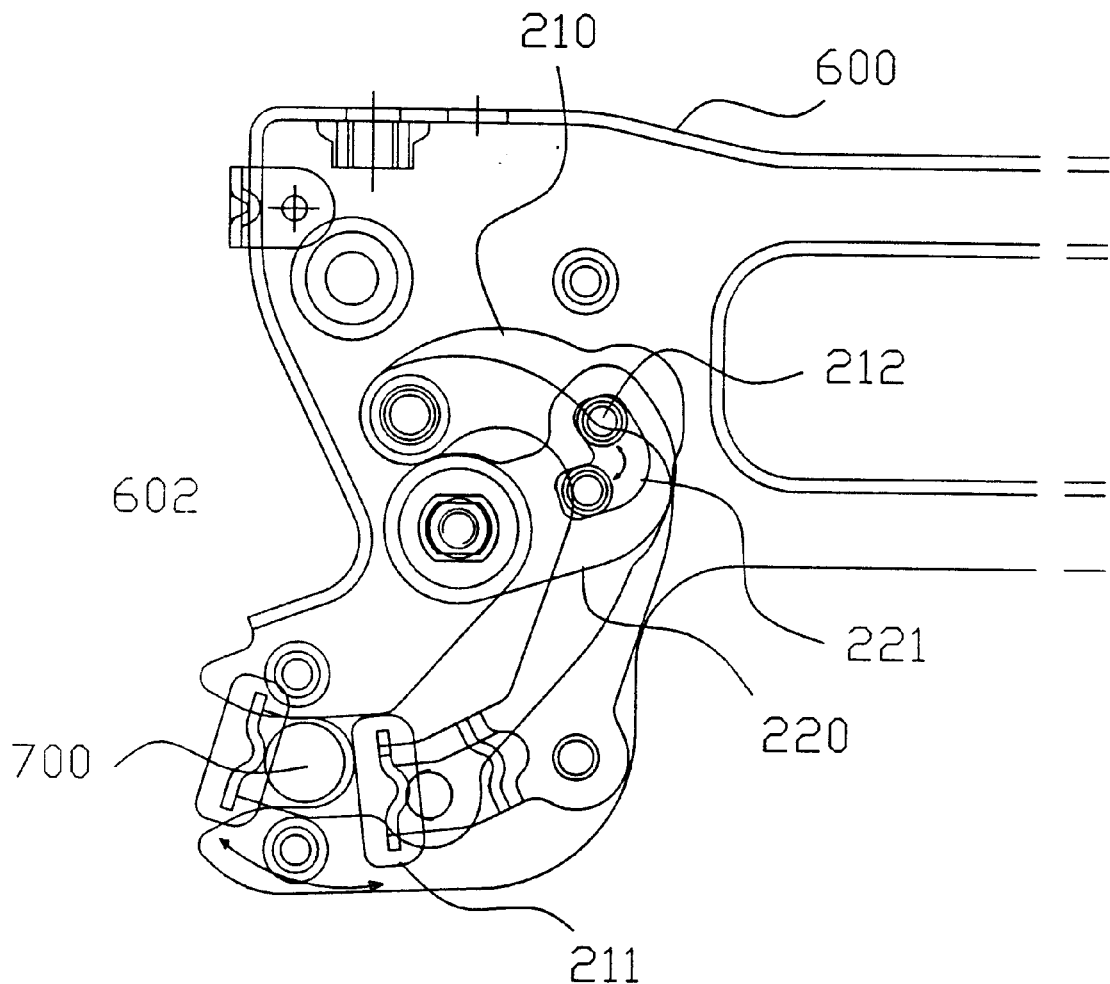
FIG. 6 is a view showing the roller locking unit of the seat leg bracket of the embodiment.

Each roller locking unit 200 serves to automatically unlock or lock the front and rear roller units 300 and 500 when the seat leg bracket 600 is attached or detached. As depicted in FIGS. 3 and 6, the roller locking unit 200 includes an operating arm 210, a rotating arm 220 and a guide return spring 230. The operating arm 210 has a rubber stopper 211 at its one end to be brought into contact with the insertion rod 700, is rotatably mounted to the seat leg bracket 600 at its other end, and has a projected rod 212 at its center portion. The rotating arm 220 has a projected rod guiding slot 221 for receiving the projected rod 212 of the operating arm 210 at its one end, and is rotatably mounted to the front main shaft 602 of the seat leg bracket 600 at its other end. The guide return spring 230 is hooked on the projected rod 212 at its one end and the rivet shaft 601 at its other end. The projected rod 212 pierces the projected rod guiding slot 221 and inserted into a guide slot (will be described, 311) formed on one side of the front roller unit 300.

The roller locking unit 200 is operated in conjunction with the front roller unit 100. The inserted insertion rod 700 is brought into contact with the rubber stopper 211 of the operating arm 210 while being inserted into the insertion notch 121, the operating arm 210 is rotated around the rivet shaft 601 by the force of the inserted insertion rod 700, and the projected rod 212 is moved along the projected rod guiding slot 221 of the rotating arm 220 and the guide slot (will be described, 311) of the front roller unit 300 by the rotation of the operating arm 210, thereby unlocking the roller units 300 and 500. At this time, since the guide return spring 230 is connected to the rivet shaft 601 fixed at its one side, the guide return spring 230 is released by the projected rod 212 that is moved along the projected rod guiding slot 221. That is, when the force of the insertion rod 700 acted on the operating arm 210 is removed, the operating arm 210 is returned to its original position by the restoring force of the guide return spring 230.

The roller locking units 200 are respectively mounted to both sides of the front portion of the seat leg bracket 600, and each front locking unit 100 and each roller locking unit 200 are respectively mounted to the inner and outer surfaces of the seat leg bracket 600.

Figure 7:
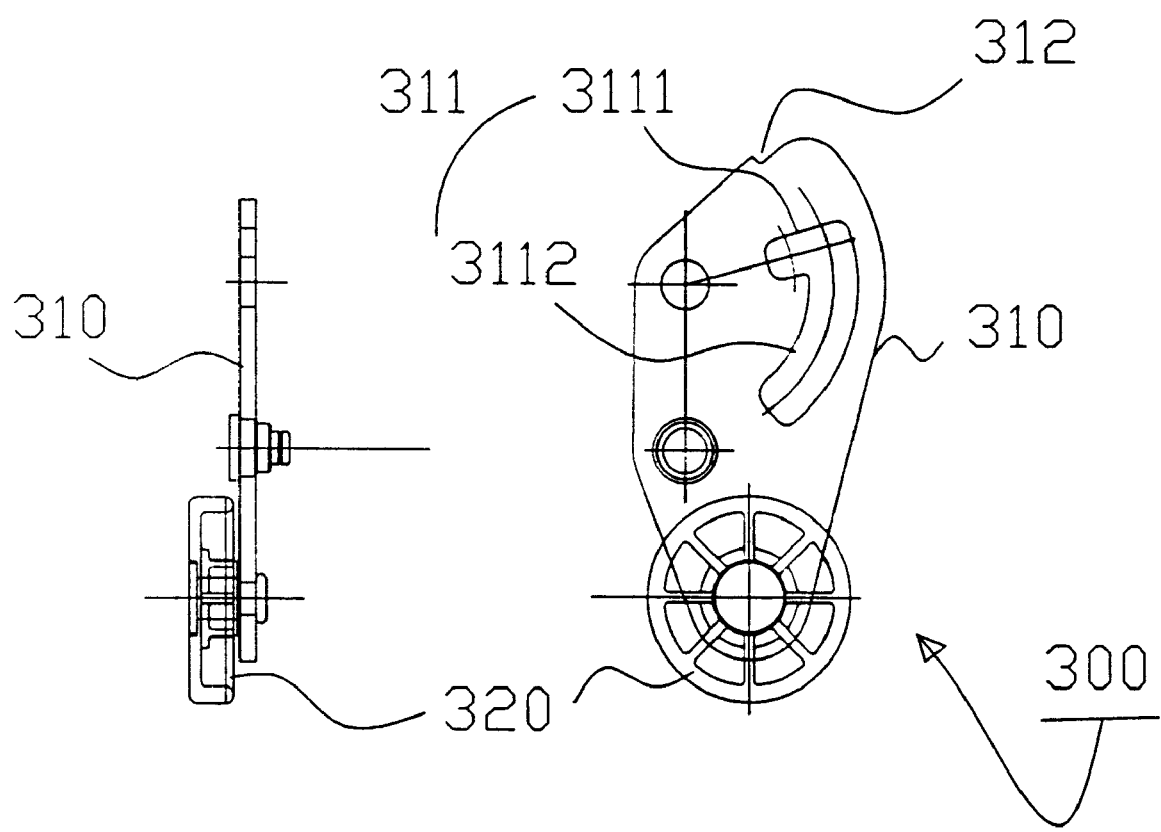
FIG. 7 is a view showing the parts of a front roller unit of the embodiment.
Figure 8:
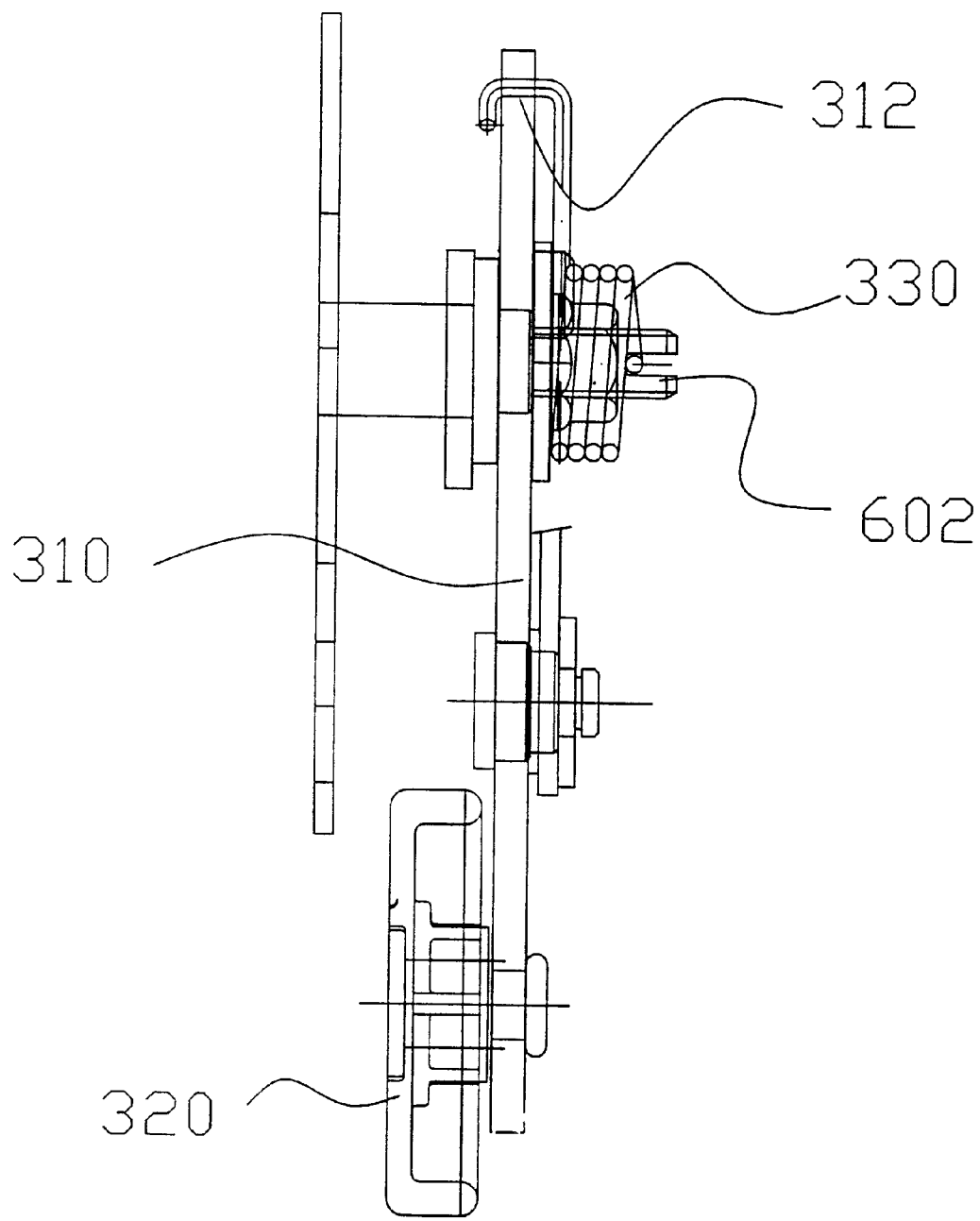
FIG. 8 is a view showing an assembled front roller unit of the embodiment.

Each front roller unit 300 serves to facilitate the movement of the detached seat. As depicted in FIGS. 3, 7 and 8, the front roller unit 300 comprises a roller bracket 310, a roller 320 and a roller return spring 330. The roller bracket 310 is rotatably mounted at its one end by means of the front main shaft 602. The roller 320 is rotatably mounted on one end of the roller bracket 310. The roller return spring 330 is mounted to the front main shaft 602 with its one end hooked into the front main shaft 602 and its other end hooked on one end of the roller bracket 310. A guide slot 311 for receiving the projected rod 212 of the operating arm 210 is formed on the roller bracket 310, and a spring holding notch 312 is formed on the upper edge of the roller bracket 310.

The guide slot 311 comprises a radial slot portion 3111 along which the projected rod 212 is moved by the roller locking unit 200 and a circumferential slot portion 3112 through which the projected rod 212 is passed by the roller bracket 310 rotated around the front main shaft 602. The circumferential slot portion 3112 is formed along the radius of rotation to allow the roller bracket 310 to be rotated around the front main shaft 602, while the radial slot portion 3111 is formed along the path of the projected rod 212, which is moved by the operating arm 210 and the rotating arm 220 of the roller locking unit 200. The radial slot portion 3111 is integrated with the circumferential slot portion 3112 into the single guide slot 311. Accordingly, when the projected rod 212 is inserted into the circumferential slot portion 3111 of the guide slot 311, the roller bracket 310 is not rotated around the front main shaft 602. On the other hand, when the projected rod 212 is moved from the radial slot portion 3111 to the circumferential slot portion 3112 by the roller locking unit 200, the roller bracket 310 is rotated around the front main shaft 602.

The roller return spring 330 is mounted with its one end hooked into the front main shaft 602 and its other end hooked on the spring holding notch 312 formed on the upper edge of the roller bracket 310. The roller return spring 330 serves to bring the roller 320 disposed on the roller bracket 310 into contact with the bottom surface of the automobile body.

When the front end of the seat leg bracket 600 is locked to the insertion rod 700 fixedly mounted to the automobile body by the front locking unit 100, the roller locking unit 200 is operated by the insertion rod 700 and unlocks the front roller unit 300. The roller 320 of the unlocked front roller unit 300 is brought into contact with the bottom surface of the automobile body, compresses the roller return spring 330, and renders the projected rod 212 of the operating arm 210 to be situated in the circumferential slot portion 3112 of the guide slot 311, thereby allowing the front roller unit 300 to be folded. Since the insertion rod 700 must be inserted into the insertion slot 121 of the front stopper 120 when the insertion rod 700 fixedly mounted to the automobile body is locked by the front locking unit 100, the insertion rod 700 must be inserted into the front stopper 120 while the seat leg bracket 600 is tilted. Accordingly, when the insertion rod 700 is inserted, one end of the roller 320 of the front roller unit 300 is brought into contact with the bottom surface of the automobile body and the front roller unit 300 is rotated around the front main shaft 602 by the bottom surface of the automobile body and the seat leg bracket 600 rotated around the insertion rod 700 so as to fix the rear end of the seat leg bracket 600.

Figure 9:
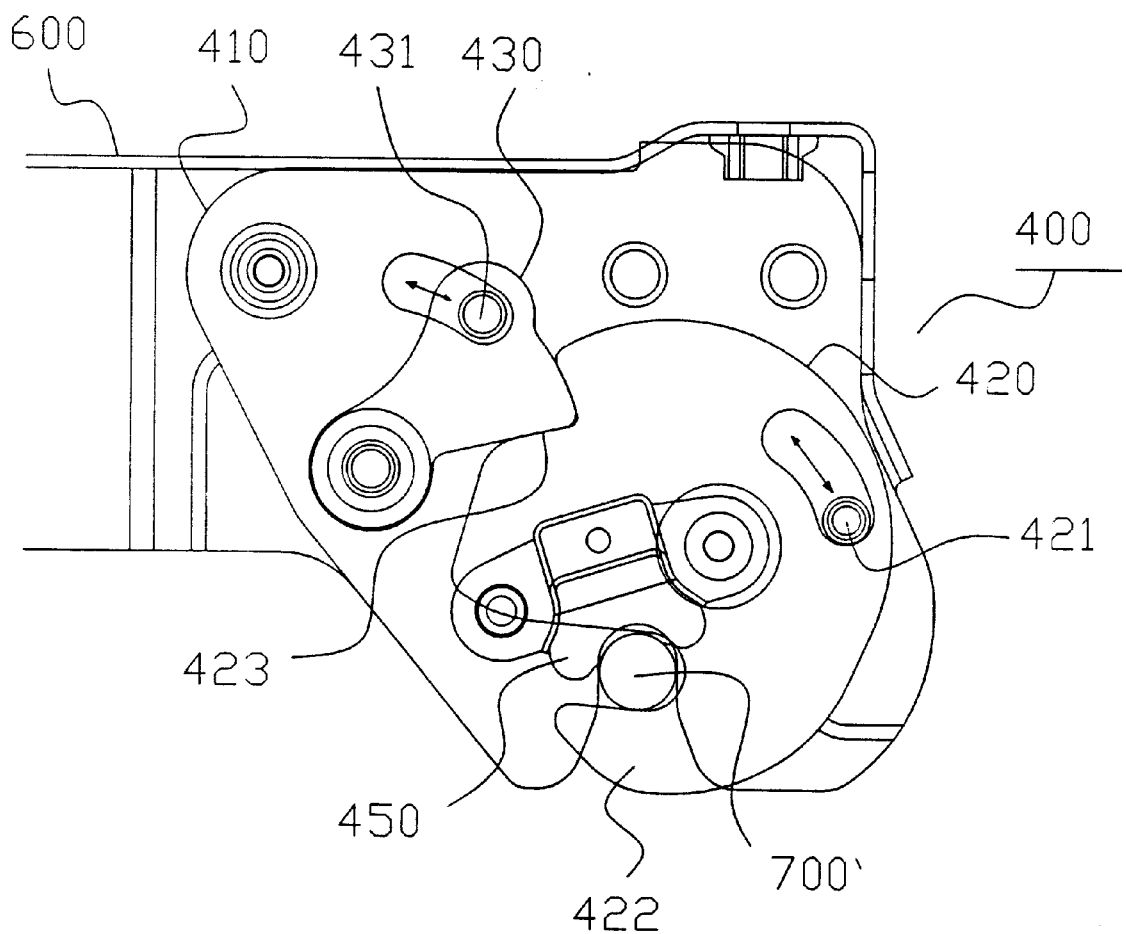
FIG. 9 is a view showing a rear locking unit of the embodiment.
Figure 10:
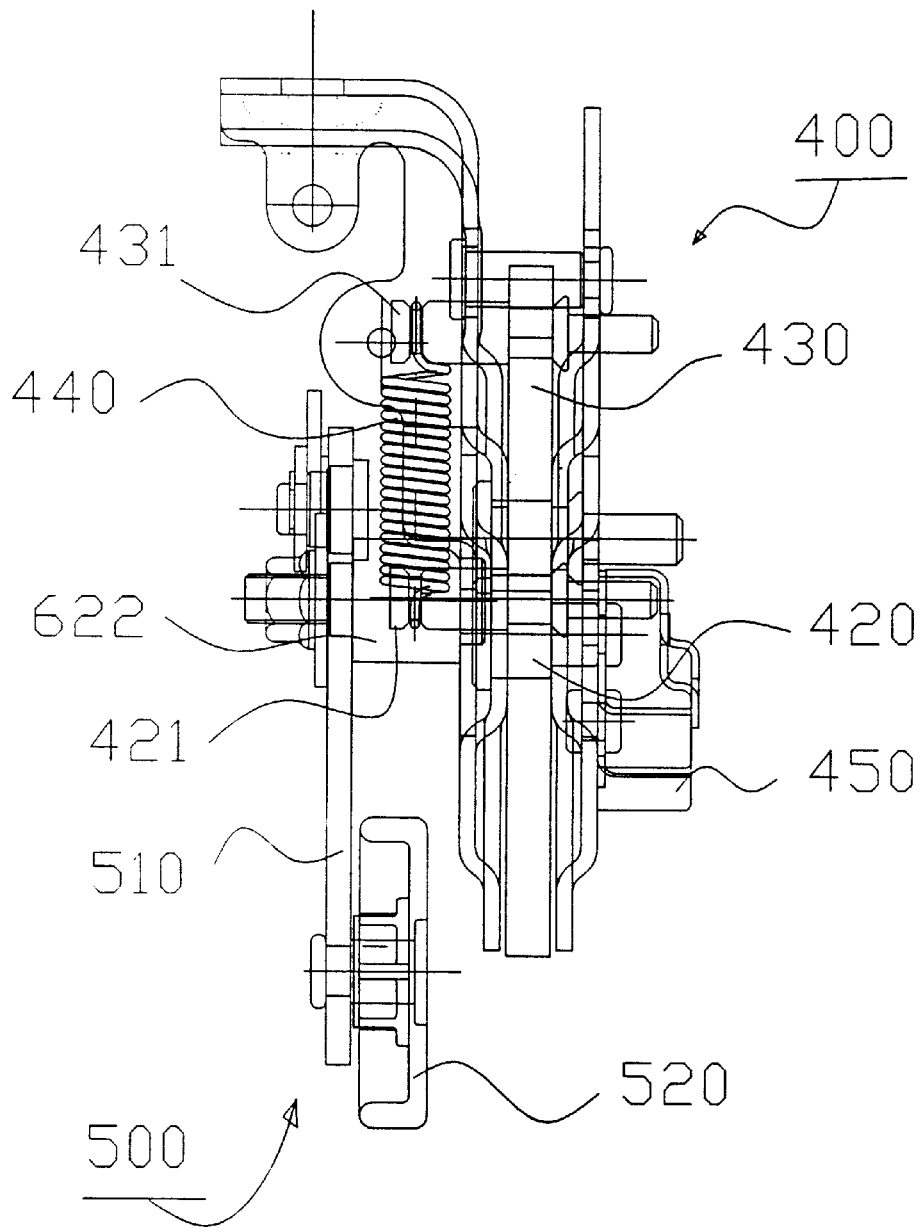
FIG. 10 is a view showing the rear portion of a seat leg bracket of the embodiment.
Figure 11:
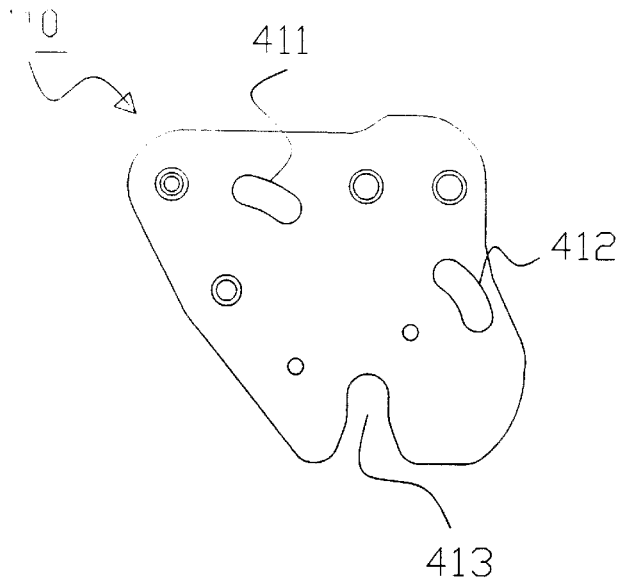
FIG. 11 is a view showing a cover bracket of the embodiment.
Figure 12:
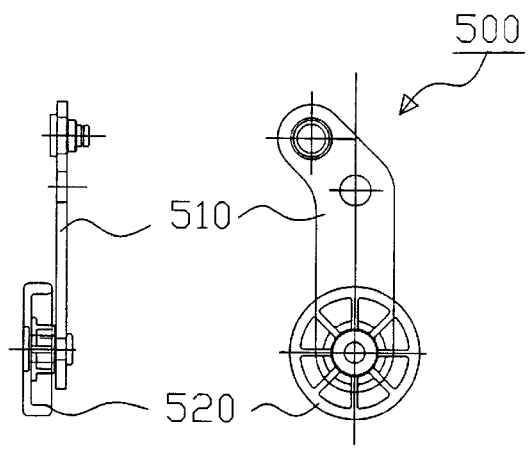
FIG. 12 is a view showing the parts of a rear roller unit of the embodiment.
Figure 13:
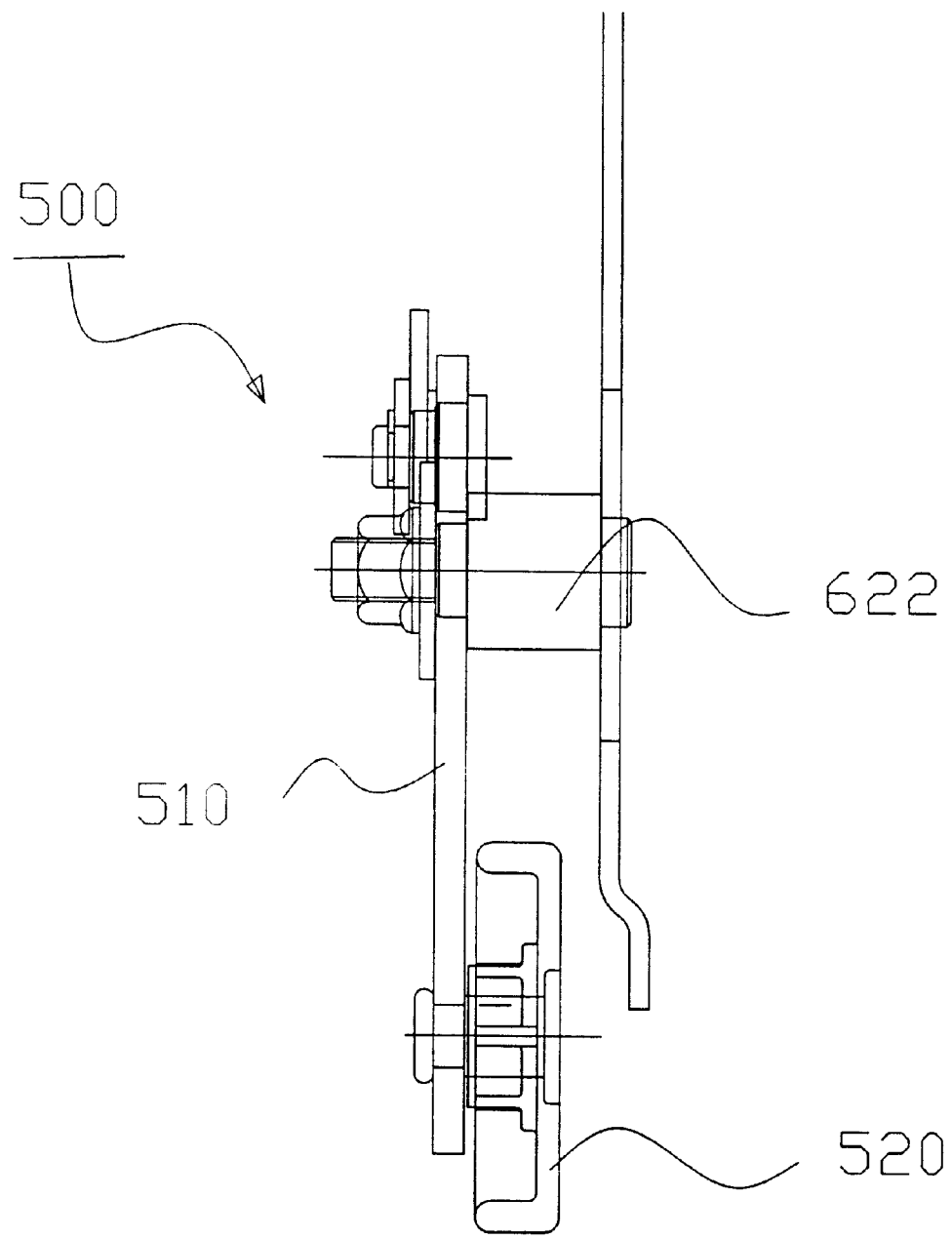
FIG. 13 is a view showing an assembled rear roller unit of the embodiment.

Each rear locking unit 400 serves to lock the rear end of the seat leg bracket 600 to the automobile body. As illustrated in FIGS. 9, 10 and 11, the rear locking unit 400 comprises a cover bracket 410, a locking plate 420, a cam 430, a catch return spring 440 and a rear stopper 450. The cover bracket 410 is riveted to the seat leg bracket 600 to be spaced apart from the seat leg bracket 600 at a predetermined interval. The locking plate 420 and the cam 430 are rotatably mounted between the cover bracket 410 and the seat leg bracket 600 by means of shafts. The catch return spring 440 is mounted with its one end fixed to a hooked rod 421 mounted to the locking plate 420 and a hooked rod 431 mounted to the cam 430. The rear stopper 450 is mounted to the side of the cover bracket 410 to which the locking plate 420 and the cam 430 are not mounted.

The locking plate 420 is rotatably mounted between the cover bracket 410 and the seat leg bracket 600. A fixing hook 422 for fixing the insertion rod 700'is formed on one end of the locking plate 420, a cam receiving notch 423 for receiving a side portion of the cam 430 is formed on a side portion of the locking plate 420, and a spring support rod 421 for allowing one end of the catch return spring 440 to be hooked on pierces a portion of the locking plate 420. The spring support rod 421 is mounted to the locking plate 420 with its both ends projected from the locking plate 420.

The cam 430 is rotatably mounted between the cover bracket 410 and the seat leg bracket 600 so that the side portion of the cam 430 is inserted into the cam receiving notch 423 of the locking plate 420. A spring support rod 431 on one end of which the catch return spring 440 is hooked is mounted to pierce the cam 430. The spring support rod 431 is mounted to the cam 430 with its both ends projected from the cam 430.

The spring support rods 421 and 431 respectively formed on the locking plate 420 and the cam 430 are inserted into the cover bracket 410 and the seat leg bracket 600. The cover bracket 410 and the seat leg bracket 600 respectively have two pairs of guide slots 411, 412, 611 and 612 and the insertion notches 413 and 613. The guide slots 411, 412, 611 and 612 serve to guide the spring support rods 421 and 431 when the locking plate 420 and the cam 430 are respectively rotated around their own rotating shafts, and the insertion notches 413 and 613 serve to receive the insertion rod 700'.

The catch return spring 440 is mounted with its one end hooked on the spring support rod 421 of the locking plate 420 and its other end hooked on the spring support rod 431 of the cam 430. In detail, the catch return spring 440 is hooked on the spring support rod 421 of the locking plate 420 and the spring support rod 431 of the cam 430 that respectively pierce the guide slots 611 and 612 of the seat leg bracket 600 to be projected from the seat leg bracket 600.

The rear stopper 450 is mounted on one side surface of the cover bracket 410 to be situated on an end portion of the insertion notch 413 of the cover bracket 410 and an end portion of the insertion notch 613 of the seat leg bracket 600, and serves to absorb the impact of the inserted insertion rod 700'.

The cover bracket 410, the seat leg bracket 600 and the insertion notch 413 of the locking plate 420 have almost the same size and depth.

The two rear locking units 400 are respectively mounted to both sides of the seat leg bracket 600. The spring support rod 431 of the cam 430 that is projected to pierce the cover bracket guiding slots 411 and 412 is integrated with a rear operating link 400' by means of a connecting plate 401'. The rear operating link 400' is rotatably mounted to a portion of the cover bracket 410.

In the rear locking unit 400 at its initial stage (unlocked stage), a side portion of the locking plate 420 covers the insertion notch 413 of the cover plate 410 and the insertion notch 613 of the seat leg bracket 600 and the side portion of the cam 430 is in contact with the edge of the locking plate 420. While the insertion rod 700' is inserted into the insertion notches 413 and 613, the inserted insertion rod 700' pushes the edge of the locking plate 420 that covers the insertion slots 413 and 613. As a result, the locking plate 420 is rotated around its shaft by the force of the inserted insertion rod 700' while releasing the catch return spring 440 and the side portion of the locking plate 420 is inserted into the cam receiving notch 423 of the locking plate 420 by the catch return spring 440 and fixes the rotated locking plate 420.

At this time, the spring support rods 421 and 431 respectively projected from the locking plate 420 and the cam 430 are respectively moved along the guide slots 411 and 412 of the cover bracket 410 and the guide slots 611 and 612 of the seat leg bracket 600, the insertion notch 413 of the cover bracket 410, the insertion notch 613 of the seat leg bracket 600 and the fixing hook 422 of the locking plate 420 form a circle, and accordingly the insertion rod 700' inserted into the insertion notch 413 of the cover plate 410 and the insertion notch 613 of the seat leg bracket 600 is locked by the fixing hook 422 of the locking plate 420.

In order to unlock the rear portion of the seat leg bracket 600, when a hook connected to the rear operating link 400' is pulled upward, the rear operating link 400' is rotated around the portion connected to the cover bracket 410, the connecting plate 401' is rotated by the rotation of the rear operating link 400', the spring support rods 421 and 431 are moved along the guide slots 411 and 413 of the cover bracket 410 and the guide slots 611 and 612 of the seat leg bracket 600 by the rotation of the connecting plate 401', and the side portion of the cam 430 releases the catch return spring 440 and is removed from the cam receiving notch 423 and simultaneously the locking plate 420 is rotated around the shaft of the locking plate 420 by the restoring force of the catch return spring 440 and unlocks the insertion rod 700' from the fixing hook 422 of the locking plate 420.

As illustrated in FIGS. 1, 2, 12 and 13, the rear roller unit 500 is connected with the front roller unit 300 through a link 800, and is operated in conjunction with the front roller unit 300. The rear roller unit 500 includes a roller bracket 510 that is rotatably mounted to the seat leg bracket 600 by the rear main shaft 622. A roller 520 is mounted to the lower portion of the roller bracket 510. The roller bracket 510 is shaped to allow its upper end to form an obtuse angle with its lower end.

In the rear roller unit 500, the upper end of the roller bracket 510 rotatably mounted to the rear main shaft 622 is connected to the front roller unit 300 by means of the link 800. The both ends of the link 800 connected to the front and rear roller units 300 and 500 are formed to have gradients.

When the front end of the seat leg bracket 600 is fixedly mounted, the front roller 300 is unlocked by the roller locking unit 200. When the front roller unit 300 is rotated around the front shaft 602 by being brought into contact with the bottom surface of the automobile body, the link 800 is moved by the roller bracket 310 of the rotated front roller unit 300. Subsequently, the roller bracket 510 of the rear roller unit 500 is rotated around the rear main shaft 622 in the direction opposite to the direction of the rotation of the front roller unit 300 by the movement of the link 800, so that the rear roller unit 500 is folded toward the seat leg bracket 600.

As described above, the two front locking units 100, the two roller locking units 200, the two front roller units 300, the rear locking units 400 and the two rear roller units 500 and are respectively mounted to both sides of the seat leg bracket 600. The two front locking units 400 respectively mounted to both sides of the seat leg bracket 600 are connected by the front operating link 100', and the two rear locking units 400 mounted to both sides of the seat leg bracket 600 are connected by the rear operating link 400'.

In a case where the detachable seat of the present invention is desired to be attached to the insertion rods 700 and 700' fixedly mounted to the automobile body, if the seat leg bracket 600 provided with a seat cushion is moved while the seat leg bracket 600 is tilted to allow the insertion rods 700 to be inserted into the insertion notches 121 of the front stoppers 120, the front end of the seat leg bracket 600 is locked by the front locking units 100 and simultaneously the front and rear roller units 300 and 500 are unlocked by the roller locking units 200 and the seat leg bracket 600 is rotated around its locked rear portion to allow the insertion rods 700' to be inserted into the insertion notches of the rear locking units 400, the front and rear roller units 300 and 500 are respectively rotated around the front and rear main shafts 602 and 622 and folded toward the seat leg bracket 600 and simultaneously the insertion rods 700' are inserted into the insertion notches and automatically locked by the rear locking units 400.

In a case where the detachable seat of the present invention is desired to be detached from the insertion rods 700 and 700', the rear locking unit 400 is unlocked by the operation of the rear operating link 400', the seat leg bracket 600 is rotated around the front portion of the seat leg bracket 600 in the direction opposite to the direction of the rotation in which the seat leg bracket 600 is rotated to attach the detachable seat of the present invention, and the front locking unit 100 is unlocked by the operation of the front operating link 100', thus detaching the detachable seat of the present invention from the automobile body.

Since the front roller units 300 are returned to their original positions by the action of the locking returning springs 140 and the rear roller units 500 connected with the front roller units 300 by the links 800 are also returned to their original positions, the rollers 320 and 520 are situated beneath the seat leg bracket 600. When the rollers 320 and 520 are situated beneath the seat leg bracket 600, the detached seat can be moved to a desirable place using the rollers 320 and 520.

As described above, the present invention provides a detachable seat for an automobile, which allows large space to be ensured for freight in an automobile and permits the automobile to be utilized for freight and traveling purposes because the seat is easily attached to and detached from an automobile body, and which allows the seat to be easily moved and deposited by the old and the weak because its rollers are automatically folded to and unfolded from the lower portion of the seat.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A detachable seat for an automobile, comprising:
   a seat cushion;
   a seat leg bracket mounted to a lower surface of said seat cushion, said seat leg bracket having two laterally spaced portions;
   two front locking units for locking a front portion of the seat to an automobile body, said front locking units being mounted to both sides of a front portion of the seat leg bracket and being connected to each other by a front operating link to be operated in conjunction with each other;

two roller locking units mounted to the front portion of the seat leg bracket to be respectively connected to the front locking units;

two front roller units mounted to the front portion of the seat leg bracket to be respectively connected to the roller locking units;

two rear locking units mounted to both sides of a rear portion of the seat leg bracket on an opposite side of the seat leg bracket to the rear roller units and connected to each other by a rear operating link to be operated in conjunction with each other; and two rear roller units mounted to the rear portion of the seat leg bracket to be respectively connected to the front roller units by links.

2. The seat according to claim 1, wherein each of said front locking units comprises:

a base bracket having a guide slot, said base bracket being mounted to the seat leg bracket to be spaced apart from the seat leg bracket by a predetermined interval;

a front stopper having an insertion notch, said front stopper being interposed between the base bracket and the seat leg bracket to be in contact with an surface of the base bracket and one surface of the seat leg bracket;

a locking bracket having a hook for fixing the insertion rod of an automobile body at its one end, a spring support rod piercing the guide slot of the base bracket at its other end to be projected from the locking plate and a connecting arm connected with a front operating link at its center portion, said locking bracket being connected to a surface of the base bracket to which the front stopper is not mounted, in a hinge fashion; and a locking return spring disposed between the seat leg bracket and the base bracket with its first end hooked on the spring support rod of the locking bracket and its second end hooked on the a rivet shaft connecting the seat leg bracket and the base bracket.

3. The seat according to claim 1, wherein each of said roller locking unit comprises:

an operating arm having a rubber stopper at its first end to be in contact with the insertion rod, being rotatably mounted to the seat leg bracket at its second end, and having a projected rod at its center portion;

a rotating arm having a projected rod guiding slot for receiving the projected rod of the operating arm at its one end and being rotatably mounted to a front main shaft of the seat leg bracket at its other end; and a guide return spring hooked on the projected rod at its one end and the rivet shaft at its other end.

4. The seat according to claim 3, wherein said guide slot comprises a radial slot portion and a circumferential slot portion that are integrated with each other into a single slot, the projected rod being moved along said radial slot portion by the roller locking unit, the projected rod passing through said circumferential slot portion by the roller bracket rotated around the front main shaft.

5. The seat according to claim 1, wherein said front roller unit comprises:

a roller bracket having a guide slot for receiving the projected rod of the operating arm and having a spring holding notch on its upper edge, said roller bracket being rotatably mounted to the seat leg bracket at its one end by means of the front main shaft, a side surface of said roller bracket being connected with one end of a link in a hinge fashion;

a roller rotatably mounted on a lower portion of the roller bracket; and a roller return spring mounted to the front main shaft with its first end hooked into the front main shaft and its second end hooked on one end of the roller bracket.

6. The seat according to claim 1, wherein said rear roller unit comprises:

a roller bracket rotatably mounted to the seat leg bracket by a rear main shaft, an upper end of said roller bracket forming an obtuse angle with an lower end of said roller bracket being connected with one end of a link in a hinge fashion; and a roller mounted to a lower portion of the roller bracket.

7. The seat according to claim 1, wherein said rear locking unit comprises:

a cover bracket having two guide slots and an insertion notch for receiving an insertion rod fixed to an automobile body, said cover bracket being riveted to the seat leg bracket to be spaced apart from the seat leg bracket at a predetermined interval;

a locking plate having a fixing hook for fixing the insertion rod on its one side portion, a cam receiving notch for receiving a side portion of the cam on its other side portion and a spring support rod at its other side portion, both ends of the spring support rod piercing and being projected from the guide slots of the cover bracket and the seat leg bracket, said locking plate being rotatably mounted between the cover bracket and the seat leg bracket by means of a shaft;

a cam having a spring support rod that pierces the guide slots of the cover bracket and the seat leg bracket, said cam being rotatably mounted between the cover bracket and the seat leg bracket by means of a shaft to be situated on the same plane as that of the locking plate;

a catch return spring support on a first spring support rod of the locking plate and a second spring support rod of the cam that pierce the guide slots of the seat leg bracket to be projected from the seat leg bracket; and a rear stopper mounted on one side surface of the cover bracket to be situated at one end portion of the insertion notch of the cover bracket and one end portion of the insertion notch of the seat leg bracket.

* * * * *